(12) United States Patent
Nicolas et al.

(10) Patent No.: US 7,708,547 B2
(45) Date of Patent: May 4, 2010

(54) METHOD OF FEEDING A RUBBER-CONSUMER DEVICE WITH RUBBER, AND AN INSTALLATION FOR FEEDING THE RUBBER-CONSUMER DEVICE WITH RUBBER

(75) Inventors: Serge Nicolas, Clermont-Ferrand (FR); Gérard Crosnier, Ceyrat (FR); Daniel Goy, Cebazat (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 135 days.

(21) Appl. No.: 12/006,519

(22) Filed: Jan. 3, 2008

(65) Prior Publication Data
US 2008/0197527 A1 Aug. 21, 2008

(30) Foreign Application Priority Data
Jan. 3, 2007 (FR) .................................. 07 52514

(51) Int. Cl.
*B29B 15/00* (2006.01)
*B29B 7/66* (2006.01)
*B29B 17/00* (2006.01)
*B28B 11/12* (2006.01)
*B28B 3/20* (2006.01)
*B26D 7/06* (2006.01)
*B29C 47/00* (2006.01)
*B29C 37/02* (2006.01)

(52) U.S. Cl. .................... 425/472; 425/305.1; 425/215; 83/89; 264/37.3; 264/37.32; 264/161; 264/176.1

(58) Field of Classification Search ............... 425/377, 425/317, 308, 215, 217, 806, 305.1, 289, 425/376.1, 472; 83/74, 75, 75.5, 84, 89, 83/167, 331, 949, 951, 77, 72; 264/37.3, 264/37.32, 161, 176.1

See application file for complete search history.

(56) References Cited

U.S. PATENT DOCUMENTS

| 3,396,429 A | | 8/1968 | Geyer | |
| 3,738,580 A | | 6/1973 | Harris | |
| 3,800,894 A | * | 4/1974 | Keser et al. | .................... 177/64 |
| 5,030,079 A | * | 7/1991 | Benzing, II | .................. 425/140 |

FOREIGN PATENT DOCUMENTS

| GB | 615 526 | 1/1949 |
| JP | 2005/022333 | 1/2005 |

OTHER PUBLICATIONS

French Search Report dated Jul. 11, 2007 for the corresponding French Patent Application No. FR 0 752 514.

* cited by examiner

*Primary Examiner*—Joseph S Del Sole
*Assistant Examiner*—Ninh V Le
(74) *Attorney, Agent, or Firm*—Cohen Pontani Lieberman & Pavane LLP

(57) ABSTRACT

A method of the type in which a strip of rubber is moved continuously from a rubber-supplier device to a consumer device. During the continuous movement and prior to reaching the consumer device, a portion, referred to as the residue, is taken continuously from the strip of rubber. The residue is taken by continuously cutting the strip of rubber. For example, the supplier device includes upstream storage means for storing the strip of rubber from which the strip is moved toward the extruder, and downstream storage means in which the residue is stored. After the strip of rubber on the upstream storage means has been used up, the upstream and downstream storage means are swapped with each other.

11 Claims, 1 Drawing Sheet

METHOD OF FEEDING A RUBBER-CONSUMER DEVICE WITH RUBBER, AND AN INSTALLATION FOR FEEDING THE RUBBER-CONSUMER DEVICE WITH RUBBER

RELATED APPLICATIONS

This application claims the priority of French patent application filed Jan. 3, 2007, the entire content of which is hereby incorporated by reference.

FIELD OF THE INVENTION

The present invention relates to a method of feeding rubber to a rubber-consumer device and to an installation for feeding rubber to said rubber-consumer device.

The invention applies in particular to feeding rubber to an extruder for producing a rubber extrusion for use in tire manufacture.

BACKGROUND OF THE INVENTION

In the state of the art, a method is already known for feeding rubber to at least a first rubber-consumer device, the method being of the type in which a strip of rubber is moved continuously from a rubber-supplier device to the first consumer device.

In the particular application envisaged above, the extruder forms the first rubber-consumer device. The extruder is fed with the strip of rubber. The width of the strip of rubber needs to be matched to the delivery rate of the extruder.

In certain situations, it is desirable to use small extruders, in particular extruders that deliver extruded rubber at a rate of less than 3 kilograms per minute (kg/min). Such a rate is satisfactory given the advantage achieved by the small hinderance of such an extruder.

Optimizing the production of strips of rubber leads to strips being made that are relatively wide, typically strips that are 800 millimeters (mm) to 1000 mm wide. Consequently, when not using an extruder that is overdimensioned and capable of consuming that type of relatively wide strip of rubber directly, the strip is sliced into a plurality of slices, each of width adapted to an extruder having a low extrusion rate. That therefore leads to expensive slicing operations that are generally performed on premises that are different from the premises on which the rubber is consumed, involving intermediate storage, and/or handling of sliced rubber strip.

OBJECT AND SUMMARY OF THE INVENTION

One object of the present invention is to enable extruders of a variety of extrusion rates to be used, in particular extruders presenting low rates, while limiting as much as possible operations of slicing the strips of rubber for feeding them.

To this end, one aspect of the invention is directed to a method of feeding rubber to at least a first rubber-consumer device, the method being of the above-specified type wherein, during the continuous movement, and prior to reaching the consumer device, a portion, referred to as the residue, is taken continuously from the strip of rubber.

By taking an appropriate quantity of residue, the strip of rubber feeding the first consumer device is matched to the extrusion rate thereof, whatever that rate might be. Thus, an embodiment of the invention makes it possible, on the premises where the rubber is consumed, to take a residue from the total strip of rubber that constitutes an increasingly large fraction thereof when the consumer device presents low rubber consumption capacity, or conversely a decreasingly small fraction when the consumer device presents higher rubber consumption capacity.

It is thus possible with a relatively wide strip of rubber to feed a consumer device presenting consumption capacity that can equally well be low or high, while avoiding any need, with a low consumption capacity device, to slice the strip of rubber away from the premises on which the rubber is consumed, avoiding any intermediate storage of sliced rubber, and avoiding operations of handling slices of the initial strip of rubber.

According to other characteristics of the method of the invention that are optional:

The residue is taken by continuously cutting off a residue strip from the strip of rubber.

The residue strip presents a width lying in the range one-half to nine-tenths the width of the strip of rubber.

The first consumer device is an extruder.

The supplier device includes upstream rubber storage means from which the strip of rubber is moved towards each consumer device.

According to another optional characteristic of the method of the invention, the residue is stored in downstream storage means.

Advantageously, the upstream and downstream storage means are swapped over after the strip of rubber in the upstream storage means has been used up.

Thus, when the strip of rubber feeding the first consumer device has been completely used up, the upstream and downstream storage means are swapped over so that the storage means containing the residue becomes, in turn, the rubber-supplier device. The swapping operation can be performed as often as is possible, given the width of the initial strip and the consumption rate of the consumer device.

Furthermore, the last feeder strip corresponding to the last residue can be fed directly to the consumer device, thus allowing the storage means to be refilled concurrently without interrupting production.

In an implementation of the method, a second rubber-consumer device is fed with the residue.

When the strip of rubber presents a width that is suitable for feeding two consumer devices, the width of the strip fed to the first consumer device is adapted to the consumption capacity of said first consumer device and the width of the residue is adapted to the consumption capacity of the second consumer device. This avoids any need to store the residue.

The width of the cut is regulated with the help of appropriate means, thereby making it possible, in real time, to adjust the rate at which the consumer device is fed, which can be particularly advantageous when the consumer device needs to adapt to variations associated with the fabrication process downstream.

Another aspect of the invention is directed to an installation for feeding rubber to at least the first rubber-consumer device, the installation being of the type comprising means for continuously moving a strip of rubber from a rubber-supplier device to the first consumer device, the installation including taker means for continuously taking a portion, referred to as a residue, from the strip of rubber, said taker means being arranged upstream from the first consumer device.

Such an installation makes it possible to take the residue in such a manner that the strip of rubber fed to the first consumer device is adapted to said first consumer device.

According to optional characteristics of the installation of the invention:

The taker means comprise means for continuously cutting off a strip that is taken from the strip of rubber.

The installation includes means for automatically positioning cutter means transversely relative to the longitudinal edges of the strip of rubber. Such means are advantageous since they make it possible to have a residue strip of varying width and a strip feeding the consumer device that is of constant width. Such an installation is thus advantageous when the strip of rubber presents irregular longitudinal edges.

The first consumer device is an extruder.

The extruder comprises an extruder worm screw of diameter less than 90 mm, the extruder presenting, where appropriate, an extruded rubber delivery rate of less than 3 kg/min.

The installation includes upstream rubber storage means from which the strip of rubber is to be moved towards each consumer device.

The supplier device includes downstream storage means for storing the residue.

The installation includes swap means for swapping over the upstream and downstream storage means.

The swap means comprise a movable support movable in rotation about an axis, the upstream and downstream storage means being carried by the movable support. Such swap means are effective and easy to make.

In an embodiment of the installation, the installation includes a second rubber-consumer device for feeding with the residue.

According to another optional characteristic of the installation of the invention, the installation includes regulator means for regulating the feed rate of at least the first consumer device by regulating the width of the residue.

Such regulator means enable the width of the strip of rubber to be adapted to the consumption rate of the first consumer device, which rate may be variable.

DETAILED DESCRIPTION OF THE DRAWINGS

Figure 1:
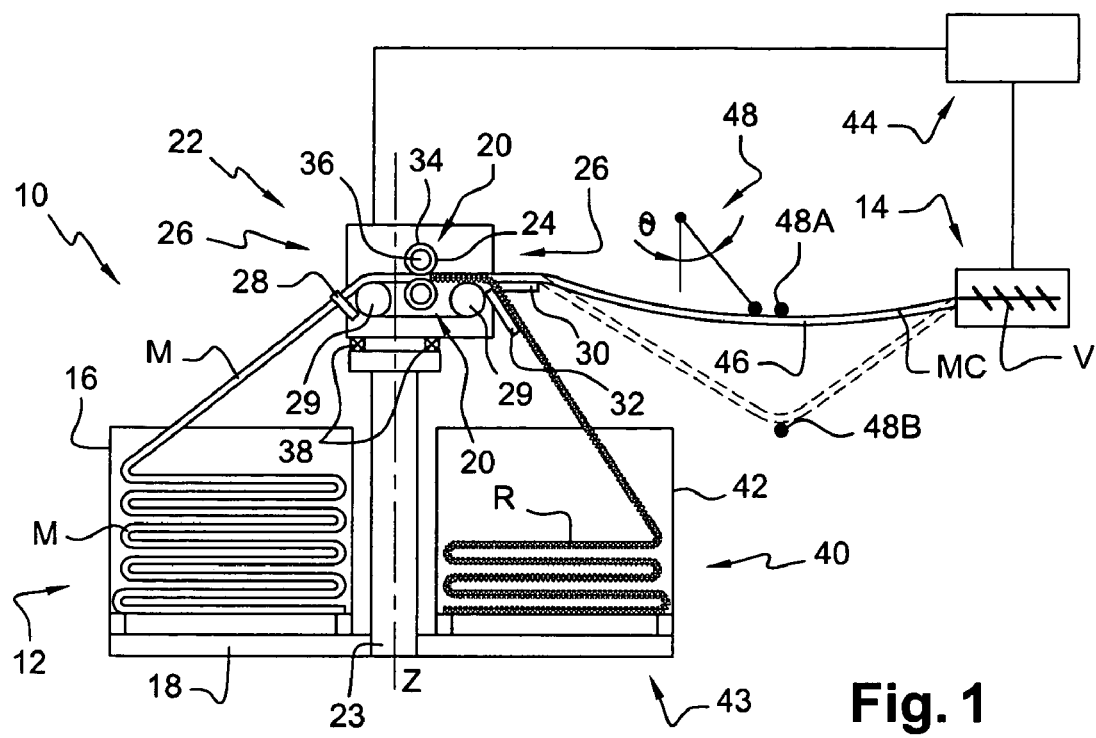
FIG. 1 is a diagrammatic elevation view of a rubber feeder installation constituting an embodiment of the invention.

FIG. 1 shows a rubber feeder installation constituting an embodiment of the invention, and given overall reference 10.

The installation 10 comprises a rubber-supplier device 12 and a rubber-consumer device 14 that consumes said rubber.

Below, the upstream and downstream means of the installation 10 are distinguished relative to the travel direction of the rubber going from the supplier device 12 towards the consumer device 14.

In this embodiment of the invention, the rubber-supplier device 12 comprises upstream rubber storage means 16, e.g. a pallet on which a strip of rubber M is stored.

The strip of rubber M is to be displaced from the supplier device 12 towards the consumer device 14 by means that are described below.

In the example described, the strip of rubber M is about 200 mm wide and it has a mean thickness of about 10 mm. In a variant, the width and the thickness of the strip of rubber could be different. In particular, the width of the strip of rubber could be greater than 200 mm, and could be as much as 800 mm. Longitudinally, the strip of rubber M is folded back-and-forth in boustrophedon manner in the upstream storage means 16.

The upstream storage means 16 are carried on a base 18 forming a first support that is mounted to move in rotation about an axis Z that is substantially vertical.

In order to move the strip of rubber towards the consumer device 14, the installation 10 comprises displacement means 20 carried by a support 22. The support 22 is carried by a vertical post 23 of axis that coincides substantially with the axis Z. More particularly, the displacement means 20 comprise two superposed drive rollers 24 mounted to rotate about respective parallel axes of rotation on the support 22. The strip of rubber M is driven by passing between the rollers 24.

The support 22 also carries guide means 26 for guiding the strip of rubber M through the support 22.

By way of example, the guide means 26 comprise an upstream guide member forming a fairlead 28, two guide rollers 29 mounted to rotate on the support 22 respectively upstream and downstream from the drive rollers 24, and two downstream guide members formed by plates 30, 32.

The consumer device 14, constituted by the extruder, comprises an extrusion worm screw V. In the example described, the diameter of the worm screw V is less than 90 mm, such that the extruder has a relatively limited capacity for consuming rubber, the rate at which rubber is extruded remaining less than 3 kg/min. The extruder consumes the remainder of the rubber strip, designated by reference MC.

In order to adapt the width of the rubber strip M to the relatively small consumption capacity of the device 14, the installation 10 includes means 34 for continuously taking a portion of the rubber strip M, the taken portion being referred to as the residue R. These taker means 34 are situated upstream from the consumer device 14.

Thus, in the example shown, the taker means 34 comprise cutter means 36 for continuously cutting off a strip that is taken from the strip of rubber M. These cutter means 36, carried by the drive rollers 24, include at least one rotary blade carried by one of the drive rollers 24, or two rotary blades, carried by the two drive rollers 24 to form scissors.

In order to ensure that the transverse position of the strip of rubber M relative to the longitudinal direction in which the residue strip R is cut off remains substantially constant, the installation 10 includes transverse positioner means 38 for automatically positioning the cutter means 36 transversely relative to the longitudinal edges of the strip of rubber M.

Thus, in the example shown, the transverse positioner means 38 are arranged between the support 22 and the top end of the post 23.

In this embodiment of the invention, the installation 10 has downstream storage means 40 for storing the residue R. By way of example, these downstream storage means 40 comprise a pallet 42 carried by the base 18. The base 18 thus forms means 43 for swapping the upstream and downstream storage means 12 and 40.

Preferably, the installation 10 also has device 44 for regulating the rate at which the consumer device 14 is fed by regulating the width of the strip of rubber forming the residue R.

Between the consumer device 14 and the feeder installation 10, it is possible to form a compensation loop 46 of variable length in the strip MC. Variation in the length of the loop 46 can be detected by detector means 48 for continuously detecting this variation, e.g. an oscillating feeler presenting an angle of inclination θ that varies with variation in the length of the loop, or in a variant this can be done with the help of means 48A, 48B for detecting extreme values of the length of the loop. In FIG. 1, the loop 46 as drawn in continuous lines is in its minimum-length configuration, while in dashed lines it is in its maximum-length configuration.

Other types of means 48 for detecting variation in length can be used, with or without contacting the loop.

The installation 10 serves to implement a method of feeding rubber to the consumer device 14, of which the main aspects associated with the invention are described below.

To feed the consumer device 14 with rubber, the strip of rubber M is moved continuously from the supplier device 12 towards the consumer device 14 with the help of the displacement means 20.

During this continuous displacement, and before reaching the consumer device 14, the residue R is taken off continuously with the help of the means 34.

In the example described, the residue R is taken by continuously cutting the strip forming the strip of rubber M. The residue strip preferably presents a width lying in the range one-half to nine-tenths the width of the strip of rubber.

As the residue R is taken, it is stored in the means 40. After the strip of rubber M in the upstream storage means 16 has been used up, the upstream means 46 are swapped with the downstream storage means 40 which consequently become the upstream storage means. Like the initial strip of rubber M, the residue R is then moved continuously from the supplier device 12 to the consumer device 14 with a new residue being taken during this displacement in a manner analogous to that described above.

The travel speed is adjusted as a function of variations in the length of the loop. The continuous detector means 48 enable this speed to be regulated continuously. The means 48A, 48B for detecting extreme lengths of the loop serve to perform regulation by stopping or starting the displacement means 20.

Figure 2:
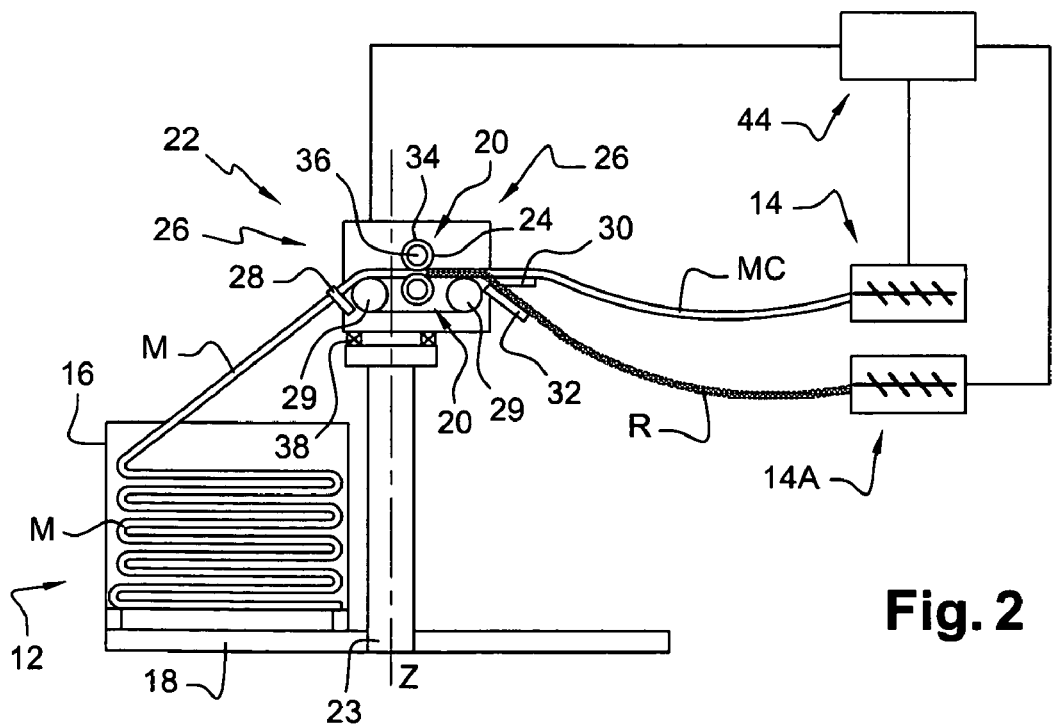
FIG. 2 is a diagrammatic elevation view of a rubber feeder installation constituting a second embodiment of an installation.

FIG. 2 shows an installation 10 constituting an embodiment that is not claimed. In FIG. 2, elements analogous to those of FIG. 1 are designated by references that are identical.

In this embodiment the installation 10 has two rubber-consumer devices, namely a first device 14 as described above and a second device 14A, e.g. constituted like the first device 14 by an extruder.

The second consumer device 14A is fed with the residue R. Where appropriate, the feed rates of the two consumer devices 14A, 14 are regulated to be identical, by regulating the width of the residue R with the help of the device 44. When the first and second consumer devices 14 and 14A are formed by two extruders having different rubber extrusion rates, it is also possible to regulate the feed rates with the help of the means 44.

What is claimed is:

1. A method of feeding rubber to at least one rubber-consumer device, the method being of the type in which a strip of rubber is moved continuously from a rubber-supplier device to a consumer device, wherein during the continuous movement and before reaching the consumer device, a portion, referred to as the residue, is taken continuously from the strip of rubber and stored in downstream storage means, wherein the supplier device includes upstream storage means for storing rubber from which the strip of rubber is moved toward the consumer device, with the upstream and downstream storage means being swapped after the strip of rubber in the upstream storage means has been used up.

2. The method according to claim 1, in which the residue is taken by continuously cutting off a residue strip from the strip of rubber.

3. The method according to claim 1, in which the residue strip presents a width lying in the range one-half to nine-tenths the width of the strip of rubber.

4. The method according to claim 1, in which the consumer device is an extruder.

5. An installation for feeding rubber to at least one rubber-consumer device, the installation being of the type comprising means for continuously moving a strip of rubber from a rubber-supplier device to a consumer device, wherein the installation includes taker means for continuously taking a portion, referred to as the residue, from the strip of rubber, said taker means being arranged upstream from the consumer device, upstream rubber storage means from which the strip of rubber is for being moved toward the consumer device, the supplier device further including downstream storage means for storing the residue, and swap means for swapping the upstream and downstream storage means.

6. The installation according to claim 5, in which the taker means comprise cutter means for continuously cutting off a strip that is taken from the strip of rubber.

7. The installation according to claim 6, including means for automatically positioning said cutter means transversely relative to the 3 longitudinal edges of the strip of rubber.

8. The installation according to claim 5, in which the consumer device is an extruder.

9. The installation according to claim 8, in which the extruder comprises an extruder worm screw of diameter less than 90 mm, the extruder being capable of providing, an extruded rubber delivery rate of less than 3 kg/min.

10. The installation according to claim 5, in which the swap means comprise a movable support movable in rotation about an axis, the upstream and downstream storage means being carried by the movable support.

11. The installation according to claim 5, including device for regulating the rate at which at least the consumer device is fed by regulating the width of the residue.

* * * * *